United States Patent
Hall et al.

(10) Patent No.: US 11,040,881 B2
(45) Date of Patent: Jun. 22, 2021

(54) METHOD FOR PREPARING A NA3V2(PO4)2F3 PARTICULATE MATERIAL

(71) Applicants: COMMISSARIAT A L'ENERGIE ATOMIQUE ET AUX ENERGIES ALTERNATIVES, Paris (FR); CENTRE NATIONAL DE LA RECHERCHE SCIENTIFIQUE (CNRS), Paris (FR); UNIVERSITE DE PICARDIE JULES VERNES, Amiens (FR)

(72) Inventors: Nikita Hall, Grenoble (FR); Sylvain Boulineau, Amiens (FR); Laurence Croguennec, Saint Selve (FR); Sébastien Launois, Grenoble (FR); Christian Masquelier, Boves (FR); Loïc Simonin, Vinay (FR)

(73) Assignees: COMMISSARIAT A L'ENERGIE ATOMIQUE ETAUX ENERGIES ALTERNATIVES, Paris (FR); CENTRE NATIONAL DE LA RECHERCHE SCIENTIFIQUE, Paris (FR); UNIVERSITE DE PICARDIE JULES VERNES, Amiens (FR)

( * ) Notice: Subject to any disclaimer, the term of this patent is extended or adjusted under 35 U.S.C. 154(b) by 23 days.

(21) Appl. No.: 15/767,472

(22) PCT Filed: Oct. 13, 2016

(86) PCT No.: PCT/EP2016/074597
§ 371 (c)(1),
(2) Date: Apr. 11, 2018

(87) PCT Pub. No.: WO2017/064189
PCT Pub. Date: Apr. 20, 2017

(65) Prior Publication Data
US 2018/0297847 A1    Oct. 18, 2018

(30) Foreign Application Priority Data

Oct. 13, 2015 (FR) ..................... 1559709

(51) Int. Cl.
*C01B 25/455* (2006.01)
*H01M 4/58* (2010.01)
(Continued)

(52) U.S. Cl.
CPC ......... *C01B 25/455* (2013.01); *H01M 4/5825* (2013.01); *C01P 2002/20* (2013.01);
(Continued)

(58) Field of Classification Search
CPC .............. C01P 2002/20; C01P 2004/61; C01P 2004/62; C01P 2006/12; C01P 2006/40;
(Continued)

(56) References Cited

U.S. PATENT DOCUMENTS 6,872,492 B2    3/2005 Baker et al.
9,564,656 B1 *  2/2017 Zhamu ............... H01M 10/054
(Continued)

FOREIGN PATENT DOCUMENTS

WO    2015067316 A1    5/2015

OTHER PUBLICATIONS

Serras Paula et al: "Electrochemical performance of mixed valence Na3V2O2x(PO4)2F3-2x/C as cathode for sodium-ion batte", Journal of Power Sources. vol. 241, 2013, pp. 56-60, XP028675776, ISSN: 0378-7753, DOI: 10.1016/J.JPOWSOUR.2013.04.094 abstract, pp. 57, 58: "3.1. Material characterization".
(Continued)

*Primary Examiner* — Ngoc-Yen Nguyen
(74) *Attorney, Agent, or Firm* — Cooper Legal Group, LLC; Ronald M. Kachmarik

(57) ABSTRACT

A method for preparing a $Na_3V_2(PO_4)_2F_3$ material, including at least the steps: a) reducing the vanadium oxide, $V_2O_5$,
(Continued)

Figure 1:
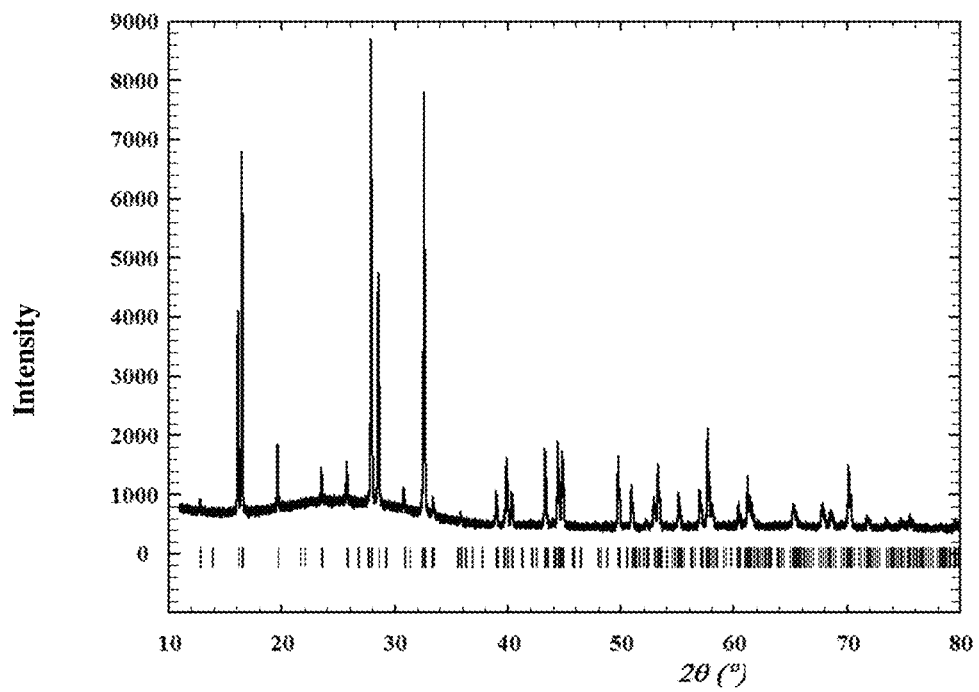

under a reducing atmosphere in the absence of elementary carbon and in the presence of at least one phosphate anion precursor in order to form vanadium phosphate, $VPO_4$; and b) exposing, under an inert atmosphere, a mixture of the $VPO_4$ material obtained in step a) with an effective amount of sodium fluoride, NaF, and at least one hydrocarbon- and oxygen-containing compound which is a source of elementary carbon, to temperature conditions that are favourable for calcining said mixture so as to form said $Na_3V_2(PO_4)_2F_3$ compound. Also, a related electrode material, an electrode and a secondary sodium battery using the presented material.

21 Claims, 2 Drawing Sheets

(51) Int. Cl.
*H01M 10/054* (2010.01)
*H01M 4/02* (2006.01)

(52) U.S. Cl.
CPC ...... *C01P 2004/61* (2013.01); *C01P 2004/62* (2013.01); *C01P 2006/12* (2013.01); *C01P 2006/40* (2013.01); *H01M 10/054* (2013.01); *H01M 2004/028* (2013.01)

(58) Field of Classification Search
CPC .............. C01B 25/455; H01M 10/054; H01M 2004/028; H01M 4/5825
See application file for complete search history.

(56) References Cited

U.S. PATENT DOCUMENTS

| | | | |
|---|---|---|---|
| 2011/0210288 A1* | 9/2011 | Barker | C01B 25/45 252/182.1 |
| 2014/0234700 A1* | 8/2014 | Moriwaka | H01M 4/136 429/199 |
| 2016/0285086 A1* | 9/2016 | Zhu | C01B 25/377 |

OTHER PUBLICATIONS

Chihara K et al: "Cathode properties of Na3M2(P04) 2F3 [M=Ti, Fe, V] for sodium-ion batteries", Journal of Power Sources 2013 Elsevier NLD, vol. 227, 2013, pp. 80-85, XP002759422, DOI: 10.1016 J. JPOWSOUR.2012.10.034, quote in the application, p. 81, left column, paragraph 2.

M. Bianchini et al: "Na 3 V 2 (PO 4 ) 2 F 3 Revisited: a High-Resolution Diffraction Study" Chemistry of Materials, vol. 26, No. 14, Jul. 22, 2014 (Jul. 22, 2014), pp. 4238-4247, XP055229830. US ISSN: 0897-4756, DOI: 10.1021/cm501644g, abstract, p. 4239: "Table 1".

Song W et al: "Multifunctional dual Na3V2(P04) 2F3 cathode for both lithium-ion and sodium-ion batteries", RSC Advances 2014 Royal Society of Chemistry GBR, vol. 4, No. 22. 2014, pp. 11375-11383, XP002759423, DOI: 10.1039/C3RA47878E, abstract, p. 11376: right column, last paragraph, p. 11377, right column.

Corresponding International Application No. PCT/EP2016/074597, International Search Report dated Nov. 17, 2016, 3 pages.

* cited by examiner

METHOD FOR PREPARING A NA3V2(PO4)2F3 PARTICULATE MATERIAL

The present invention relates to the field of secondary batteries. It aims more particularly to provide a method for preparing an active material for secondary electrodes and more particularly for cathodes of sodium-ion batteries.

The demand for lithium-ion batteries has increased in recent years from the viewpoint of their use in a large variety of electronic devices, such as mobile telephones and electric vehicles. However, lithium-based compounds are relatively expensive and natural lithium sources are unequally distributed over the planet and are not very accessible because they are located in a small number of countries. Alternatives to this element have therefore been sought. For this purpose, sodium-ion batteries have been developed. Sodium is in fact very abundant and uniformly distributed, and is advantageously non-toxic and economically more advantageous.

However, the redox potential of the $Na^+/Na$ couple is $-2.71$ V vs. ESH and therefore greater than that of the $Li^+/Li$ couple ($-3.05$ V vs. ESH), for a triple molar mass. These specificities make the choice of a host material difficult. Recently, the $NaVPO_4F$ material has been proposed as cathode material for sodium-ion batteries. Likewise, $Na_3V_2(PO_4)_2F_3$ has proved to be a particularly advantageous material from the viewpoint of its electrochemical performance levels.

Methods have therefore been developed for preparing the $Na_3V_2(PO_4)_2F_3$ material. Conventionally, $V_2O_5$ is reduced in the presence of phosphoric acid or of a precursor of the latter, so as to form $VPO_4$, the latter then being calcined under an inert atmosphere in the presence of NaF so as to form $Na_3V_2(PO_4)_2F_3$.

Regarding the first step of the $V_2O_5$ reduction, several alternatives are currently available. However, none of them may actually be extrapolated to the preparation of significant amounts and is therefore suitable for use on an industrial scale.

Thus, Barker et al, proposes, in U.S. Pat. No. 6,872,492, carrying out the $V_2O_5$ reduction by mixing it with $NH_4H_2PO_4$ and carbon black. This conventional method uses elemental carbon as reducing agent. This method of reduction is also known as carbothermic reduction. The use of elemental carbon as reducing agent is advantageous in two respects. First of all, elemental carbon, which is naturally a good conductor, proves to be an effective reducing agent with regard to $V_2O_5$. Moreover, its use in excess results in the formation of a composite material having better conductive properties. However, the material thus obtained is in the form of aggregates of primary particles, the size of which is several micrometers.

It should also be noted that the fact that the precursors are extremely close together allows better reactivity during heat treatment and also an optimization of the reducing role of the carbon. For these purposes, this prior method requires two compression steps: the first carried out prior to the first calcination reaction resulting in the formation of $VPO_4$ makes it possible to promote reactivity between the precursors and homogeneous reduction by the carbon, whereas the second, prior to the second calcination reaction resulting in the formation of $Na_3V_2(PO_4)_2F_3$, promotes the reactivity and minimizes any contact with the atmosphere that might be a source of oxidation during the annealing allowing the formation of $Na_3V_2(PO_4)_2F_3$ or during the cooling. It also makes it possible to avoid too great a growth of the primary particles. However, these compression steps are precisely undesirable from an industrial point of view.

Moreover and as illustrated in example 3 hereinafter, the implementation of a carbothermic reduction without a compression step results in a material which has lesser electrochemical properties.

An alternative to carbothermic reduction favors the use of hydrogen as reducing agent, in a form diluted with argon. Thus, Chihara et all. (Ref. 1) consider a step of reduction of $V_2O_5$ under an atmosphere of argon diluted to 5% by volume of hydrogen in the presence of $NH_4H_2PO_4$. The $VPO_4$ material thus formed is then mixed with NaF, and the whole is compacted then calcined so as to form the expected $Na_3V_2(PO_4)_2F_3$. However, a step of carbon enrichment of this $Na_3V_2(PO_4)_2F_3$ material is then necessary in order to confer thereon advantageous conductive properties. This embodiment variant therefore also proves to be not suitable for use on an industrial scale.

Consequently, there remains the need for a method for preparing $Na_3V_2(PO_4)_2F_3$ which is suitable for implementation on an industrial scale and therefore suitable for the production of this material on a production scale at least equal to 100 g.

There also remains a need for a method which does not require a compression step for densifying the intermediate products.

There also remains a need for a method which makes it possible to obtain a $Na_3V_2(PO_4)_2F_3$ material which has advantageous or even improved electrochemical performance levels.

The object of the present invention is precisely to meet these needs.

Thus, the present invention, according to one of its aspects, relates to a method for preparing a $Na_3V_2(PO_4)_2F_3$ material, comprising at least the steps consisting in a) reducing the vanadium oxide, $V_2O_5$, under a reducing atmosphere in the absence of elemental carbon and in the presence of at least one phosphate-anion precursor so as to form vanadium phosphate, $VPO_4$, and b) exposing, under an inert atmosphere, a mixture of the $VPO_4$ material obtained in step a) with an effective amount of sodium fluoride, NaF, and of at least one hydrocarbon-based and oxygen-containing compound, which is a source of elemental carbon, to temperature conditions suitable for calcining said mixture so as to form said $Na_3V_2(PO_4)_2F_3$ compound.

According to the method of the invention, the $Na_3V_2(PO_4)_2F_3$ material is obtained in the pulverulent state. More specifically, the $Na_3V_2(PO_4)_2F_3$ material is in the form of primary particles with an average dimension of less than 2 μm and which are constituent particles of aggregates.

Advantageously, the average dimension of the aggregates is less than 25 micrometers, preferably less than 10 micrometers, and in particular between 3 and 10 micrometers, while the average dimension of the primary particles forming said aggregates is between 200 nm and 2000 nm, preferably between 200 and 600 nm.

Unexpectedly, the inventors have in particular noted that carrying out the $VPO_4$ calcination step in the presence of NaF and of an elemental carbon organic precursor makes it possible specifically to satisfy all the abovementioned expectations.

More particularly, the material according to the invention crystallizes in an orthorhombic lattice of Aman space group with the following lattice parameters:

a is between 9.028 and 9.030, preferably substantially equal to 9.029, b is between 9.044 and 9.046, preferably substantially equal to 9.045, c is greater than or equal to 10.749 and preferably substantially equal to 10.751.

First of all, the use of such an organic precursor makes it possible to consider a reduction of the $V_2O_5$ under a reducing atmosphere and in the absence of elemental carbon.

The method according to the invention makes it possible to dispense with the mechanical compression operations conventionally required and proves to be efficient for producing amounts of $Na_3V_2(PO_4)_2F_3$ which go beyond 100 g per production batch, thereby making it suitable for implementation on an industrial scale.

The $Na_3V_2(PO_4)_2F_3$ material obtained according to the invention advantageously has a significantly reduced particulate size compared with a material obtained at the end of a method requiring a carbothermic reduction on a scale of 100 g and more. This reduced size is particularly advantageous for ion diffusion in the material when the latter is used as an active material of an electrode.

The $Na_3V_2(PO_4)_2F_3$ material obtained according to the invention advantageously has a BET specific surface area at least equal to 1 $m^2/g$ and preferably ranging from 3 $m^2/g$ to 20 $m^2/g$.

Moreover, the constituent primary particles of the aggregates which make up the $Na_3V_2(PO_4)_2F_3$ material have a coating of elemental carbon which makes it possible to significantly increase the conductive properties of said material.

Finally, the reducing atmosphere during the first step makes it possible to increase the reduction of the $V^{5+}$ to $V^{3+}$, and the presence of an elemental carbon precursor during the second step makes it possible to limit as much as possible the oxidation of the $V^{3+}$ ions to $V^{4+}$ ions and to limit the growth of the primary particles and thus to increase the electrochemical performance levels of the material.

Unexpectedly, the method according to the invention therefore makes it possible to obtain a $Na_3V_2(PO_4)_2F_3$ material with a high $V^{3+}$ ion content or else a low $V^{4+}$ content. The electrochemical performance levels of the material obtained according to the invention, in connection with this increased $V^{3+}$ ion content and in connection with the low $V^{4+}$ content, are in particular verified in example 3.

Thus, according to another of its aspects, the present invention relates to a $Na_3V_2(PO_4)_2F_3$ material made up of primary particles of which the average size is less than 2 μm, in particular between 200 nm and 2000 nm, preferably less than 1 μm, and even more particularly between 200 and 600 nm, and which are surface-coated with conductive carbon.

The $Na_3V_2(PO_4)_2F_3$ material according to the invention has more particularly an orthorhombic lattice of Aman space group with the following lattice parameters:

a is between 9.028 and 9.030, preferably substantially equal to 9.029, b is between 9.044 and 9.046, preferably substantially equal to 9.045, c is greater than or equal to 10.749 and preferably substantially equal to 10.751.

The conductive carbon is present in a proportion of from 0.5% to 5% by weight and preferably from 1% to 3% by weight of the total weight of the material.

The primary particles are present within the material in the form of aggregates.

Such compounds prove to be particularly advantageous as active materials of electrodes for secondary batteries, in particular sodium or sodium-ion batteries.

Thus, the invention also relates, according to another of its aspects, to the use of a compound according to the invention as an electrode material, in particular a positive-electrode material for a sodium or sodium-ion battery. It also relates to such an electrode material and to the electrode thus formed. Finally, a subject of the invention is a sodium or sodium-ion battery comprising an electrode material as defined above.

The electrode comprises a $Na_3V_2(PO_4)_2F_3$ material obtained according to the invention, a polymer or binder and optionally an additional conductive compound such as a carbon-based compound.

The use of the compounds according to the invention as an electrode material proves to be advantageous in several respects.

First of all, the electrodes formed according to the invention have good flexibility and lightness, properties which are particularly sought for the production of storage batteries.

They have very good chemical, heat and electrochemical stability.

Other characteristics, variants and advantages of the compounds according to the invention, of the preparation thereof and of the use thereof will emerge more clearly on reading the description, the examples and the figures which follow, which are given by way of nonlimiting illustration of the invention.

Preparation Method According to the Invention a) Vanadium Oxide Reduction

As stated above, the first step of the method requires the reduction of the V:0 material under a reducing atmosphere.

For the purposes of the invention, the term reducing atmosphere describes a gas or mixture of gases capable of providing a reducing effect with regard to a reaction carried out under this atmosphere.

This reduction is carried out according to the invention in the absence of elemental carbon.

In this respect, the reduction step considered according to the invention is different than a carbothermic reduction.

It does not therefore use, as reducing agent, under the experimental conditions suitable for the reduction of the vanadium oxide, elemental carbon like in particular carbon black.

Preferably, the method according to the invention uses dihydrogen as reducing agent.

Thus, the reducing atmosphere considered according to the invention is advantageously totally or partially made up of hydrogen. It may thus be pure dihydrogen or dihydrogen diluted with one or more other inert gases, such as for example argon or nitrogen.

For example, it may be a mixture of argon and dihydrogen in the proportion 98%:2% by volume respectively.

With regard to the phosphate-anion precursor, it is a compound capable of generating phosphate anions under the experimental conditions of the reduction. In general, it is salts or compounds linking to one or more phosphate anions, one or more cations, such as an alkali, alkaline-earth or transition metal, or else a cationic complex, for instance the ammonium ion or a quaternary ammonium.

For the purposes of the invention, the compound which is a phosphate-anion source may in particular be chosen from $H_3PO_4$, $H(NH_4)_2PO_4$ and $H_2NH_4PO_4$. Preferentially, it is $H_2NH_4PO_4$.

With regard to the amount of compound which is a phosphate-anion source, it is of course adjusted so as to obtain the expected $VPO_4$ derivative.

The starting products, namely the $V_2O_5$ and the phosphate-anion precursor, are mixed and exposed to the selected reducing atmosphere, preferably argon diluted to 2% with dihydrogen, and the whole mixture is heated to a temperature suitable for carrying out the desired reduction, generally to approximately 800° C.

The adjustment of the experimental parameters, such as temperature increase rate and reaction time, are clearly part of the competence of those skilled in the art.

As illustrated in example 1 hereinafter, the mixture of starting products may be heated to with a temperature flow of 10° C./minute up to 800° C. and maintained at this temperature for 3 hours.

b) Conversion of the Vanadium Phosphate into $Na_3V_2(PO_4)_2F_3$

The vanadium phosphate obtained at the end of the reduction step is advantageously consecutively treated so as to form the expected product.

As previously stated, the vanadium phosphate obtained according to the invention does not need to be compacted or alternatively compressed in order to increase the density of the power, prior to its conversion into $Na_3V_2(PO_4)_2F_3$.

The method according to the invention is thus advantageously devoid of mechanical compression steps, in particular of a mechanical compression step between its step of reduction of the vanadium oxide into vanadium phosphate and the step of conversion of the latter into expected compound.

The vanadium phosphate conversion step uses sodium fluoride as source both of sodium ions and of fluoride ions and at least one hydrocarbon-based and oxygen-containing compound capable of generating elemental carbon.

With regard to this hydrogen-based and oxygen-containing compound, it may in particular be a sugar such as, for example, glucose, sucrose or fructose, or a carbohydrate such as, for example, starch or a cellulose-based derivative.

Preferentially, it is a cellulose-based derivative and even more particularly microcrystalline cellulose.

As described in detail above, the decomposition of this hydrocarbon-based compound during the reaction of the vanadium phosphate $VPO_4$ with NaF so as to form $Na_3V_2(PO_4)_2F_3$ is dedicated, on the one hand, to incorporating carbon into $Na_3V_2(PO_4)_2F_3$ and, on the other hand, to providing the vanadium ions $V^{3+}$ with increased protection against a phenomenon of oxidation to $V^{4+}$ during the heat treatment.

The presence of carbon within and at the surface of the constituent aggregates of the $Na_3V_2(PO_4)_2F_3$ material makes it possible to increase its conductive performance levels.

Advantageously, the elemental carbon is at least in the form of a coating on all or part of the external surface of the constituent primary particles of the aggregates forming the $Na_3V_2(PO_4)_2F_3$ material.

The amount and chemical nature of the carbon precursor are adjusted so as to provide this coating under the experimental conditions selected for the vanadium phosphate conversion. This adjustment is clearly within the competence of those skilled in the art.

For example, in the case where this derivative is cellulose, it may be used in the proportions suitable for obtaining a carbon coating representing 0.5% to 5% by weight of the total weight of the material.

In general, all of the raw materials, including the sodium fluoride, NaF, are mixed, and the mixture thus formed is heated under an inert atmosphere under heating temperature and time conditions that are suitable for the formation of the expected $Na_3V_2(PO_4)_2F_3$ particulate material by calcination.

The adjustment of the operating parameters, such as, for example, temperature, temperature increase rate and temperature-maintenance time, are clearly within the competence of those skilled in the art.

By way of illustration, the calcination sought may be carried out by heating, for example for approximately one hour, the mixture to 800° C. under an inert atmosphere.

The cooling of the $Na_3V_2(PO_4)_2F_3$ material may be rapid, and is advantageously carried out immediately by simply taking the product formed out of the oven at 800° C.

At the end of the method according to the invention, the $Na_3V_2(PO_4)_2F_3$ material is purified. This purification step generally comprises a step of washing with water and a consecutive drying step.

This $Na_3V_2(PO_4)_2F_3$ material is suitable for use as conductive material for forming electrodes.

$Na_3V_2(PO_4)_2F_3$ Material According to the Invention

This material according to the invention is also identified in the abbreviated form NVPF-H in the remainder of the description.

As mentioned above, the present invention also targets a $Na_3V_2(PO_4)_2F_3$ material made up of primary particles with an average dimension of less than 2 µm and surface-coated with conductive carbon. The primary particles form aggregates, in particular with an average size of less than 25 micrometers, preferably less than 10 micrometers, and in particular between 3 and 10 micrometers.

The average particulate size may be measured by scanning electron microscopy (SEM).

The $Na_3V_2(PO_4)_2F_3$ material has a BET specific surface area at least equal to 1 $m^2/g$ and preferably ranging from 3 $m^2/g$ to 20 $m^2/g$.

This surface area may in particular be measured by virtue of the nitrogen adsorption according to the BET (Brunauer, Emmett and Teller) technique.

Advantageously, the $Na_3V_2(PO_4)_2F_3$ material according to the invention contains from 0.5% to 5% by weight and preferably from 1% to 3% by weight of conductive carbon relative to its total weight.

As stated above, this carbon contributes to the conductive performance levels of the material by virtue of its natural conductivity.

The $Na_3V_2(PO_4)_2F_3$ material according to the invention also has an increased purity with regards to its high $V^{3+}$ ion content or else its low $V^{4+}$ content. This gain in purity is in particular verified in example 3 through the electrochemical performance levels of the material obtained according to the invention.

As specified in the publication Paula Serras et al. (Ref. 2), the presence of $V^{3+}$ and $V^{4+}$ cations in a $Na_3V_2(PO_4)_2F_3$ material is conventionally illustrated by means of the following chemical formula $Na_3V_2O_x(PO_4)_2F_{3-x}$ with x ranging from zero to 2.

When x is equal to zero, this formula is $Na_3V_2(PO_4)_2F_3$ and the vanadium element is present therein in the $V^{3+}$ form.

When x is equal to 2, this formula is $Na_3(VO)_2(PO_4)_2F$ and the vanadium element is present therein in the $V^{4+}$ form.

Insofar as the vanadium is predominantly present in the $V^{3+}$ form in this type of material, use is conventionally made of the formula $Na_3V_2(PO_4)_2F_3$ formula to represent it.

According to the invention, the $Na_3V_2(PO_4)_2F_3$ material advantageously has an orthorhombic lattice of Amam space group with the following lattice parameters:

a is between 9.028 and 9.030, preferably substantially equal to 9.029, b is between 9.044 and 9.046, preferably substantially equal to 9.045, c is greater than or equal to 10.749 and preferably substantially equal to 10.751.

In the context of the present invention, this proportion of $V^{4+}$ cation is significantly reduced compared with the same existing materials. Thus, a material according to the invention advantageously has a $V^{4+}$ cation content at most equal to 1% by weight. This low proportion may in particular be represented by a $V^{4+}/V^{3+}$ molar ratio of less than 5% and preferentially less than 1%.

Electrode Active Material

As specified above, the $Na_3V_2(PO_4)_2F_3$ material according to the invention is particularly advantageous as an active material of an electrode.

Thus, according to another of its aspects, the invention also relates to an active material of an electrode comprising at least one $Na_3V_2(PO_4)_2F_3$ material in accordance with the invention.

This material may be used together with one or more additional compounds conventionally used, for instance a binder or a conductive additive.

Said electron-conducting additive(s) may be chosen from carbon fibers, carbon black, carbon nanotubes, graphite and analogs thereof.

The binder(s) may be advantageously chosen from fluorinated binders, in particular from polytetrafluoroethylene, polyvinylidene fluoride, carboxymethylcellulose-derived polymers, polysaccharides and latexes, in particular of styrene-butadiene rubber type.

The electrode thus prepared is deposited on an electron-conducting current collector. This collector may be aluminum.

Preferably, the electrode material represents from 10% to 95% by weight of the total weight of the electrode, in particular more than 40% by weight, and more particularly from 40% to 80% by weight relative to the total weight of said electrode.

An electrode according to the invention may be used as a positive electrode of a lithium generator or sodium generator.

Advantageously, it is preferred for use as a positive electrode for a secondary sodium or sodium-ion battery.

As mentioned above, the present invention also relates to a secondary sodium battery comprising an electrode according to the invention.

A secondary sodium battery according to the invention may more particularly comprise a positive electrode according to the invention and a negative electrode consisting for example of disordered carbon, prepared according to the same type of method as the positive electrode. It may, contrary to a secondary lithium battery, be deposited on an aluminum collector given the fact that sodium ions do not react with aluminum to form an alloy, unlike lithium ions.

The material of the negative electrode may more particularly be a disordered carbon with a low specific surface area ($<10$ m$^2$/g), the particle size of which is about one micrometer to about ten micrometers. It may be chosen from hard carbons (non-graphitizable carbon) or soft carbons (graphitizable carbon).

In the text, the expressions "between . . . and . . . " and "ranging from . . . to . . . " and "varying from . . . to . . . " are equivalent and are intended to mean that the limits are included, unless otherwise mentioned.

Unless otherwise mentioned, the expression "containing/comprising a(n)" should be understood to mean "containing/comprising at least one".

The invention will now be described by means of the following figures and examples given of course by way of nonlimiting illustration of the invention.

FIGURES

FIG. 1: X-ray diffraction characterization of $Na_3V_2(PO_4)_2F_3$ synthesized in example 1 from $VPO_4$ (reduction with $H_2$).

Figure 2:
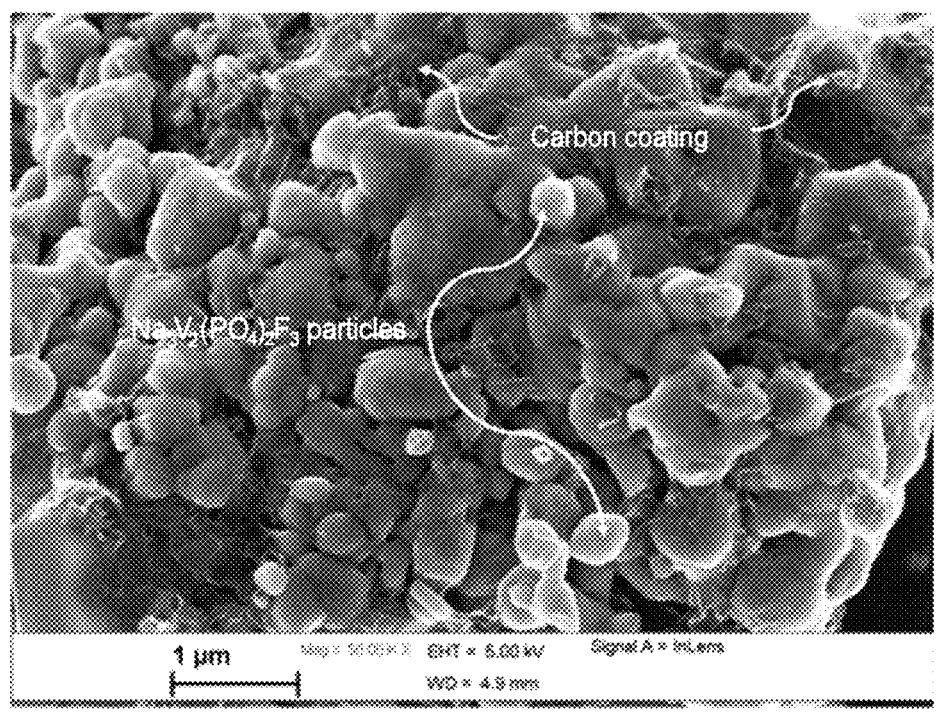

FIG. 2: SEM photo of the $Na_3V_2(PO_4)_2F_3$ material (NVPF-HC) in accordance with the invention obtained according to example 1 via the Ar/$H_2$/cellulose route.

Figure 3:
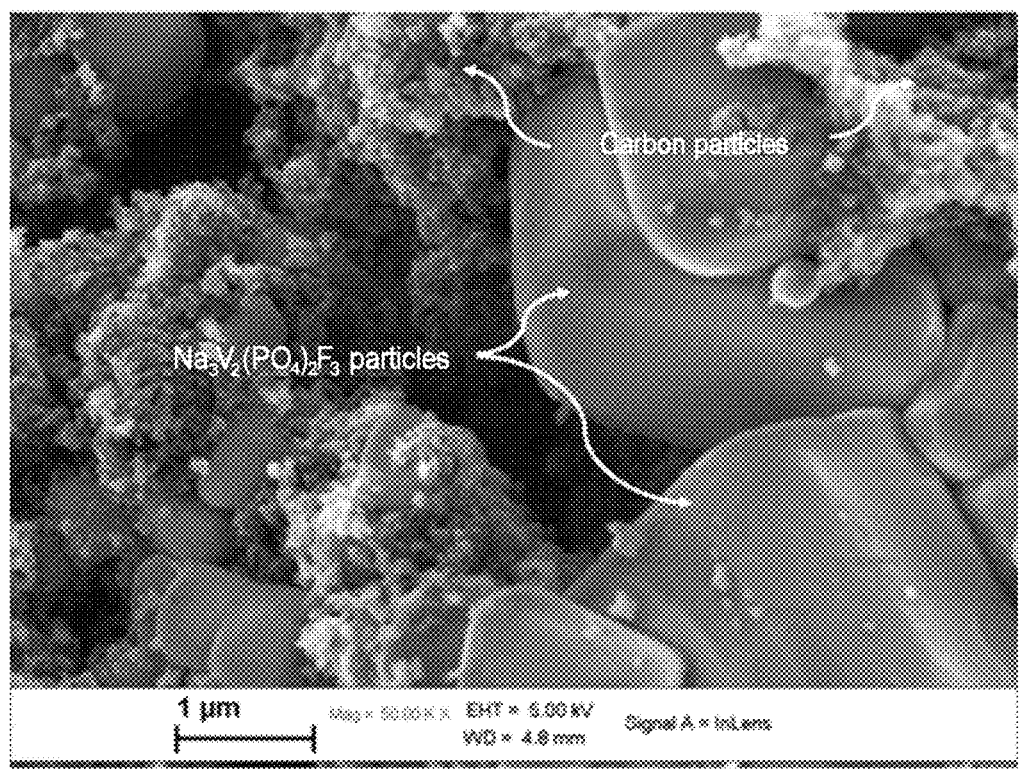

FIG. 3: SEM photo of the $Na_3V_2(PO_4)_2F_3$ material (NVPF-CB) not in accordance with the invention prepared by carbothermic reduction according to example 2.

Figure 4:
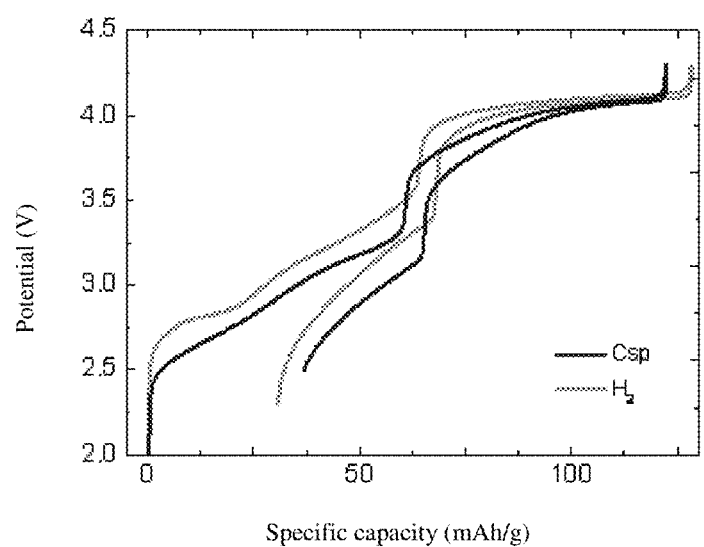

FIG. 4: Electrochemical performance level of the NVPF-CB material of example 2 (dark gray line) and NVPF-HC material of example 1 (light gray line).

LITERATURE REFERENCES

Ref 1: Kuniko Chihara et al., Journal of Power Sources 227 (2013) 80-85
Ref. 2: Paula Serras et al., J. Mater. Chem., 2012, 22, 22301
Materials and Methods The EPR spectra are produced using a Broker EMX spectrometer equipped with an ER-4192-ST and ER-4131 VT cavity at 100 k.

The SEM characterization is carried out by means of a Zeiss LEO 1530 scanning microscope.

The XR characterizations are carried out using an Empyrean PANalytical diffractometer which has a copper cathode.

Example 1

$VPO_4$ is obtained beforehand by carrying out premixing of the $V_2O_5$ (110 g) and $NH_4H_2PO_4$ (140 g) precursors in a mill. The resulting mixture is then heated in an oven at a heating rate of 10° C./minute up to 800° C. and maintained at this temperature for 3 hours under an argon atmosphere enriched with 2% $H_2$. The gray powder thus obtained was characterized by X-ray diffraction.

The $Na_3V_2(PO_4)_2F_3$ material ($>100$ g) was then prepared from a mixture of the $VPO_4$ (160 g) as prepared above, with NaF (70 g), under the stoichiometric conditions (2:3), and of cellulose (23 g). This mixture was calcined under an argon atmosphere at 800° C. for 1 hour. At the end of this calcination step, the material obtained is removed from the oven at 800° C. to be rapidly cooled. The $Na_3V_2(PO_4)_2F_3$ material (NVPF-HC) is then washed with water and dried at 80° C. for 24 hours.

FIG. 1 hereinafter reports the X-ray diffraction characterization of this product, indexed in an orthorhombic lattice (Amam space group) having the parameters a=9.02940(2) Å, b=9.04483(2) Å and c=10.75145(2) Å.

FIG. 2 reports the SEM characterization of this material in accordance with the invention.

Comparative Example 2

A $Na_3V_2(PO_4)_2F_3$ material was also prepared according to the protocol described in example 1, but by favoring a carbothermic reduction. It is also referred to hereinafter as NVPF-CB.

The essential difference compared with the protocol of example 1 consists of the use of carbon black (Timcal super C65, 18 g) which results in the formation of a particulate surface carbon of the product thus formed. Contrary to the invention, the surface carbon of the primary particles is in the form of a heterogeneous and not very dense deposit.

FIG. 3 reports the SEM characterization of this material.

Example 3: Characterization of $Na_3V_2(PO_4)_2F_3$ According to the Invention (NVPF-H) Versus $Na_3V_2(PO_4)_2F_3$ According to Example 2 (NVPF-CB)

The characterization of these two materials reveals a certain number of structural and morphological differences, the most significant of which are detectable by EPR spectroscopy, XRD and SEM.

The comparison of FIGS. 2 and 3 makes it possible to highlight these differences.

Thus, the SEM analysis reveals a clear difference in terms of primary-particle size and of the carbon-based surface coating of these particles.

The primary particles of the material synthesized using carbon black (NVPF-CB) have an average size of greater than 2 µm, whereas they are less than 2 micrometers, preferably less than 1 micrometer, more preferably between 200 and 600 nm for the particles of the material according to the invention (NVPF-H).

The presence of a carbon-based coating is also noted.

It is also observed, by laser particle size analysis (measuring apparatus: Malvern Mastersizer S model MSS), that the agglomerates of the NVPF-CB material have a volume average diameter d(v0.5) which is much greater than 25 µm. On the other hand, the volume average diameter d(v0.5) of the agglomerates of the material according to the invention is less than 10 µm.

A significant difference between the two materials is also observed by comparison of their respective EPR spectra.

The NVPF-H material advantageously reveals a much higher $V^{3+}$ content, in particular greater than or equal to 99%.

As explained in detail in the description, a $V^{4+}$ content is attributed to the oxidized species of $Na_3V_7(PO_4)_2F_3$, which is $Na_3V_2O_x(PO_4)_2F_{3-x}$.

This oxidized species was characterized by Seras et al. (ref. 2). The incorporation of a carbon-source material during the second synthesis step, and which results in the formation of a carbon-based coating of the primary particles, clearly efficiently protects the $Na_3V_7(PO_4)_2F_3$ against the phenomenon of oxidation to $Na_3V_2O_x(PO_4)_2F_{3-x}$.

It is noted that the NVPF-CB material has, on the other hand, a $V^{4+}$ content of about 1% to 5%.

These results therefore clearly reveal the advantage of the method according to the invention which makes it possible to dispense with the compression steps that may not be envisioned on the scale of an industrial production, while at the same time guaranteeing the production of an NVPF-H material with a $V^{4+}$ content that is not very high since it is at most equal to 10%.

The electrochemical performance levels of the two materials were also tested in galvanostatic mode at a constant current density of 12.8 mA/g between the voltage limits 2 V and 4.3 V. FIG. 4 reports these measurements.

The specific capacity and also the irreversibility in the first cycle of each material were determined in a button cell using a hard carbon electrode as anode.

It emerges that the NVPF-CB and NVPF-H materials have, respectively, an initial specific capacity of 122 mAh/g and 128 mAh/g and an irreversibility of 30% and 23%.

The invention claimed is:

1. A method for preparing a $Na_3V_2(PO_4)_2F_3$ material, comprising at least the steps of:
   a) reducing the vanadium oxide, $V_2O_5$, under a reducing atmosphere in the absence of elemental carbon and in the presence of at least one phosphate-anion precursor so as to form vanadium phosphate, $VPO_4$, and
   b) exposing, under an inert atmosphere, a mixture of the $VPO_4$ material obtained in step a) with an effective amount of sodium fluoride, NaF, and of at least one compound consisting of carbon, hydrogen and oxygen atoms, which is a source of elemental carbon, under temperature conditions suitable for the calcination of said mixture so as to form said $Na_3V_2(PO_4)_2F_3$ compound, characterized in that it is devoided of a mechanical compression step between step a) and step b).

2. The method as claimed in claim 1, wherein the reducing atmosphere uses dihydrogen as reducing agent.

3. The method as claimed in claim 1, wherein the phosphate-anion precursor is chosen from $H_3PO_4$, $H(NH_4)_2PO_4$ and $H_2NH_4PO_4$.

4. The method as claimed in claim 1, wherein step a) is carried out under an argon atmosphere enriched with 2% dihydrogen, and at a temperature of approximately 800° C.

5. The method as claimed in claim 1, wherein the compound consisting of carbon, hydrogen and oxygen atoms of step b) is chosen from sugars and carbohydrates.

6. The method as claimed in claim 1, wherein the calcination of step b) is carried out at 800° C. under an inert atmosphere.

7. The method as claimed in claim 1, wherein the $Na_3V_2(PO_4)_2F_3$ material is present in the form of primary particles with an average dimension of less than 2 µm and which are constituent particles of aggregates.

8. A $Na_3V_2(PO_4)_2F_3$ material made up of primary particles with an average dimension of less than 2 µm, and surface-coated with conductive carbon, said material having an orthorhombic lattice of Amam space group with the following lattice parameters:
   a is between 9.028 and 9.030,
   b is between 9.044 and 9.046,
   c is greater than or equal to 10.749.

9. The material as claimed in claim 8, containing from 0.5% to 5% by weight of conductive carbon relative to its total weight.

10. The material as claimed in claim 8, wherein the particles are in the form of aggregates.

11. The material as claimed in claim 8, having a BET specific surface area at least equal to 1 $m^2/g$.

12. The material as claimed in claim 8, having a $V^{4+}$ cation content at most equal to 1% by weight.

13. A $Na_3V_2(PO_4)_2F_3$ material made up of primary particles with an average dimension of less than 2 µm, and surface-coated with conductive carbon, said material having an orthorhombic lattice of Amam space group with the following lattice parameters:
   a is between 9.028 and 9.030,
   b is between 9.044 and 9.046,
   c is greater than or equal to 10.749,
obtained according to the method as defined in claim 1.

14. An active material of an electrode comprising at least one material as defined in claim 8.

15. An electrode totally or partially made up of a material as defined in claim 8.

16. The electrode as claimed in claim 15, also comprising a polymer or binder.

17. A secondary sodium or sodium-ion battery comprising an electrode as claimed in claim 16.

18. The method as claimed in claim 1, wherein the compound consisting in of carbon, hydrogen and oxygen atoms of step b) is a cellulose-based derivative.

19. The material as claimed in claim 9, wherein said primary particles have an average dimension between 200 and 2000 nm.

20. The material as claimed in claim 9, said material having an orthorhombic lattice of Amam space group with the following lattice parameters:
   a is substantially equal to 9.029,
   b is substantially equal to 9.045,
   c is substantially equal to 10.751.

21. The method as claimed in claim 1, wherein the phosphate-anion precursor is $H_2NH_4PO_4$.

* * * * *